United States Patent [19]

Lundman

[11] Patent Number: 4,556,163
[45] Date of Patent: Dec. 3, 1985

[54] METHOD FOR MANUFACTURING A JACK STAND

[76] Inventor: Philip L. Lundman, 419 Wheeler Ave., Fredonia, Wis. 53021

[21] Appl. No.: 747,682

[22] Filed: Jun. 24, 1985

Related U.S. Application Data

[63] Continuation of Ser. No. 455,013, Jan. 3, 1983, abandoned.

[51] Int. Cl.⁴ ............................................. B23K 31/02
[52] U.S. Cl. ................................................ 228/173.6
[58] Field of Search ................... 228/173.6, 173.4, 170; 29/150, 155; 72/329, 367, 368, 369; 254/11, 45, DIG. 1, DIG. 9; 248/351, 352, 354.5, 357, 161, 413, 519; D6/397, 486, 495, 496, 512; D11/130.1

[56] References Cited

U.S. PATENT DOCUMENTS 1,433,882 10/1922 Fancher et al. .................. 72/379 X
1,449,505  3/1923 Fancher et al. .................. 72/379 X
1,864,814  6/1932 Gallagher et al. ............... 248/534 X

OTHER PUBLICATIONS

Sears, Roebuck and Co., 1969, p. 669.

*Primary Examiner*—Nicholas P. Godici
*Assistant Examiner*—M. Jordan

[57] ABSTRACT

A jack stand and a method for manufacturing a jack stand of the type used in supporting a vehicle. A rectangular sheet metal plate is stamped so as to form at least two elongated parallel slots in the sheet metal plate, the elongated parallel slots being spaced apart from one another and each being spaced from the lateral sides of the sheet metal plate. The slots define three parallel planar legs integrally joined to a transverse body portion of the rectangular sheet metal plate. The rectangular sheet metal plate is bent such that the transverse body portion of the rectangular sheet metal plate forms a cylindrical body. The legs are each bent about a longitudinal axis and the free ends of the legs are bent radially outwardly away from one another so as to define a tetrahedral structure supporting the cylindrical body.

1 Claim, 3 Drawing Figures

METHOD FOR MANUFACTURING A JACK STAND

This application is a continuation of Ser. No. 455,013 filed Jan. 3, 1983 now abandoned.

FIELD OF THE INVENTION

The present invention relates to jack stands of the type for use by mechanics in supporting a vehicle while the vehicle is being worked on and methods for manufacturing jack stands.

BACKGROUND OF THE PRIOR ART

Jack stands are commonly used by mechanics in connection with maintenance work on vehicles, and a substantial market for jack stands is to vehicle owners who do their own maintenance work. Jack stands for sale to vehicle owners are commercially practical only if the jack stands can be manufactured at very low cost. While the manufacturer must produce a product at a very competitive price due to the large number of manufacturers in the industry, these manufacturers must also produce a high strength product fully capable of supporting the weight of a vehicle.

In one common prior art method of manufacturing jack stands, the jack stands include a base portion comprised of a cylindrical portion supported by three legs integrally joined to the cylindrical portion. A tubular member is housed in the cylindrical portion in a telescoping manner and includes an upper end adapted to support the axle or some other portion of the vehicle. The legs of the base portion diverge downwardly and outwardly from the cylindrical portion so as to define a generally tetrahedral shape. Brace members are welded to the lower ends of the legs to rigidly join the legs.

In a common form of the prior art, the base portion of the jack stand is manufactured from steel tubing having a diameter substantially the same as that of the cylindrical portion to be formed. The tubing is cut in lengths approximately equal to the vertical height of the jack stand base portion. Elongated longitudinally extending slits are formed in one end of the steel tubing. These slits have a length of approximately one-half to three-fourths of the length of the tubing and function to form three legs integrally joined to a cylindrical collar portion. The ends of the legs are then pulled outwardly so as to form the outwardly diverging legs of the jack stand. Braces are then welded to the lower ends of these outwardly diverging legs. The legs formed in this manner have a curved configuration when viewed in a horizontal cross-section and the legs will each define an arc of about 120°. This curved configuration of the legs provides legs which have substantial strength yet having a simple or simplified construction.

One of the drawbacks of this prior art construction is, however, that the elongated steel tubing used as the raw material in making the base portion of the jack is relatively expensive, particularly in view of the competitive nature of the product.

SUMMARY OF THE INVENTION

The present invention provides an improved and less expensive method for manufacturing jack stands and provides a jack stand having a strength as great as or greater than the prior art products.

The present invention includes a method for forming a jack stand wherein the base portion of the jack stand is formed from sheet metal stock rather than from the much more expensive welded steel tubing. The method of the invention also produces a jack stand having a strength at least as great as that of jack stands produced from steel tubing, and while using much less expensive materials, provides for the manufacture of a jack stand requiring little more labor and manufacturing expense than the prior art method employing the welded steel tubing as the base material.

More particularly, the invention includes a method for manufacturing a jack stand comprising the steps of providing a rectangular sheet metal plate, and stamping the rectangular sheet metal plate so as to form at least two elongated parallel slots in the sheet metal plate, the elongated parallel slots being spaced apart from one another and each being spaced from the lateral sides of the sheet metal plate by a distance substantially the same as the distance between the slots, the slots defining three parallel planar legs, and the legs each including opposite ends, one end being integrally joined to a transverse body portion of the rectangular sheet metal plate. The method also includes the steps of bending the rectangular sheet metal plate to form a cylinder such that the transverse body portion of the rectangular sheet metal plate forms a cylindrical collar having a central longitudinal axis, moving the other of the opposite ends of the legs radially outwardly away from the central longitudinal axis whereby the legs will diverge outwardly away from one another and away from the cylindrical collar.

The invention also includes a jack stand of the type for use in supporting a vehicle, the jack stand comprising a base portion having a generally cylindrical upper body portion formed from a flat steel plate bent around a longitudinal axis so as to form a cylinder, and including lateral edges welded together to form a seam. The base portion also includes a plurality of legs adapted to support the cylindrical upper body portion. The legs each include an upper end and a lower end, the upper ends of the legs being integrally joined to the upper body portion, and the legs each being formed from the flat sheet metal plate and being bent about a longitudinal axis. The legs diverge with respect to the longitudinal axis of the cylindrical upper body portion and in the direction away from the upper body portion. Means are also provided for fixedly joining the lower ends of the legs together in spaced apart relation. The jack stand also includes a vehicle supporting member having a cylindrical portion housed in the cylindrical upper body portion in telescoping relation and having an upper end adapted to support a vehicle.

One of the features of the invention is that the raw materials to be used in the manufacturing operation are substantially less costly than those employed in prior art methods and the unit price of the resultant product can be significantly less than jack stands produced from welded steel tubing.

Various other features and advantages of the invention will be apparent by reference to the following description of a preferred embodiment, from the claims, and from the drawings.

Figure 1:
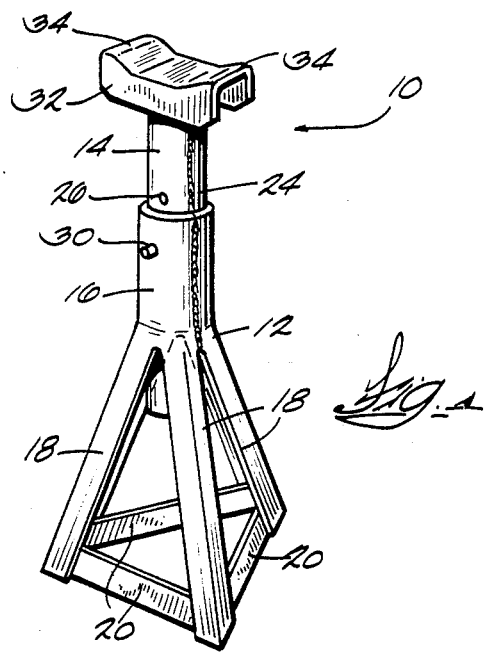
FIG. 1 is a perspective view of a jack stand embodying the invention.

Before describing at least one embodiment of the invention in detail, it is to be understood that the invention is not limited in its application to the details of construction and to the specific steps set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF A PREFERRED EMBODIMENT

Illustrated in FIG. 1 is a jack stand 10 embodying the invention and generally including a base 12 and a telescoping load supporting structure 14 supported by the base 12. The base 12 is generally comprised of a hollow tubular upper portion 16 supported by three legs 18 which are integrally joined to the tubular upper portion or cylindrical collar 16 and which extend downwardly and diverge outwardly from a lower end of the tubular upper portion 16. The legs 18 are equally spaced-apart around the circumference of the upper tubular portion 16 or with respect to the longitudinal axis of the tubular upper portion and diverge with respect to one another and with respect to a line including the longitudinal axis of the tubular upper portion. The legs 18 are thus arranged so as to form an open structure of tetrahedral shape.

The lower ends of the legs 18 are fixedly or rigidly joined together by rigid braces 20. While the braces 20 could have various constructions, in the illustrated arrangement, the braces 20 comprise elongated generally planar sheet metal bars having one end spot welded to a lower end of one of the legs 18 and an opposite end spot welded to the lower end of another of the legs 18, so as to rigidly support those legs in spaced apart relation.

While the legs 18 could have other constructions, in a preferred form of the invention, each of the legs is bent around its longitudinal axis such that when viewed in a generally horizontal cross-section, the legs each define an angle or "V". In other embodiments, each of the legs could be bent about its longitudinal axis so as to define a smooth curve.

The load supporting structure 14 comprises an elongated cylindrical member 24 having an outside diameter slightly less than the inside diameter of the tubular upper portion 16 of the base 12 and such that the cylindrical member 24 can be slideably housed in the tubular upper portion 16 for vertical adjustment. The elongated cylindrical member 24 also includes a plurality of pairs of aligned bores 26 in spaced-relation along its length. The pairs of aligned bores 26 are adapted to be aligned with a similar pair of aligned bores 28 (FIG. 3) in the upper tubular member 16, and whereby a pin 30 can be slideably inserted through the aligned bores 26 and 28. The upper end of the load supporting structure 14 includes a cross member 32 adapted to engage a portion of the vehicle such as the vehicle axle and to thereby support the vehicle. In a preferred form of the invention, the cross member 32 includes a pair of raised ears 34 at its opposite ends and so as to prevent the vehicle axle housed therebetween from falling off the jack stand 10.

Figure 2:
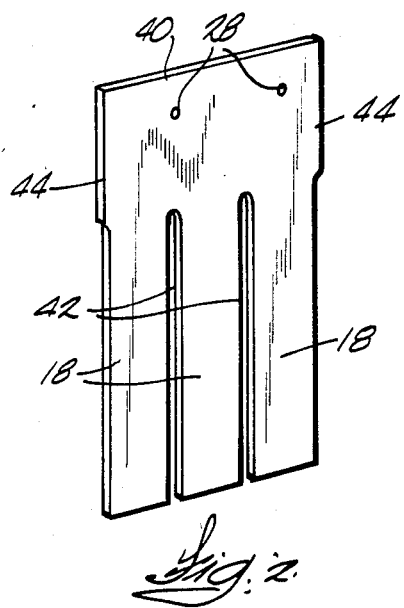
FIG. 2 is a perspective view of the sheet stock employed in the production of the base portion of the jack stand illustrated in FIG. 1, and stamped during one of the forming steps of the method embodying the invention.

Referring now to the method for manufacturing the jack stand 10 embodying the invention, in a preferred form of the invention the base portion 12 of the jack stand 10 is formed from flat sheet stock or sheet metal 40 (FIG. 2). The sheet metal 40 is subjected to a stamping operation so as to form a pair of bores 28 and a pair of parallel spaced slits 42, the slits 42 each having a length substantially equal to the length of the legs to be formed, and the slits 42 being parallel to the laternal sides 44 of the sheet stock 40.

Figure 3:
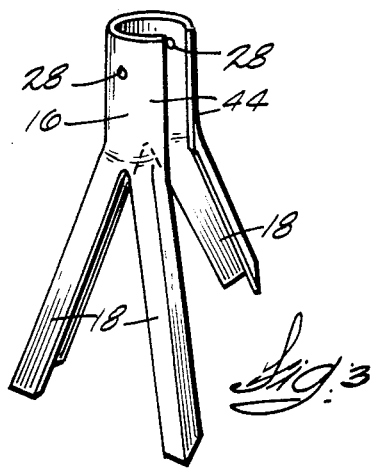
FIG. 3 is a perspective view of the base portion of the jack stand illustrated in FIG. 1 as it exists in an intermediate step of the method used to manufacture the jack stand illustrated in FIG. 1.

The stamped plate 40 is then rolled or otherwise bent about a longitudinal axis parallel to the lateral sides 44 of the sheet stock 40 and so as to form a cylinder as illustrated in FIG. 3. Each of the portions of the sheet metal plate 40 defining one of the legs 18 is bent about a line intermediate the lateral edges of the leg 18 and parallel to the longitudinally extending slots 42 such that each of these leg members 18 will be curved or bent when viewed in cross section perpendicular to the longitudinal direction of the legs. In the illustrated arrangement, the legs 18 are each bent in such a manner as to have a generally V-shaped configuration.

The lower ends of the legs 18 are also pulled outwardly with respect to the longitudinal axis of the cylindrical portion 16 of the base such that the legs 18 will diverge uniformly outwardly and downwardly. The lateral sides or edges 44 of that portion of the sheet stock material forming the upper cylindrical portion 16 of the base are then seam-welded as illustrated in FIG. 1 such that the upper cylindrical portion 16 is a uniform cylindrical structure. The brace members 20 are then welded at their opposite ends to the lower ends of the legs 18 so as to hold the legs in spaced apart fixed relation and to rigidify the lower portion of the base portion 16 of the jack stand 12.

The upper vehicle support member 14 can similarly be conveniently manufactured from flat sheet stock wherein a plurality of holes 26 are stamped in the sheet stock. The sheet is then rolled in the manner illustrated in FIG. 3 such that the tubular portion 24 is formed. The edges of the tubular portion can then be seam-welded and the upper vehicle supporting member or saddle 32 can then be welded to the upper end of the tubular portion 24. In an alternative embodiment of the invention, the tubular portion of the support member can be formed from a tubular steel pipe.

Various features of the invention are set forth in the following claims:

I claim:

1. A method for manufacturing a jack stand of the type used in supporting a vehicle, the method comprising the steps of:
   providing a rectangular sheet metal plate having opposited ends and opposite lateral edges,
   stamping the rectangular sheet metal plate so as to form a pair of elongated parallel slots in the sheet metal plate extending from one of the opposite ends of the rectangular sheet metal plate toward the other of the opposite ends of the rectangular sheet metal plate, the elongated parallel slots being spaced apart from one another, and one of the elongated parallel slots being spaced from one of the lateral edges of the rectangular sheet metal plate by a distance substantially the same as the distance between the slots, and the other of the elongated parallel slots being spaced from the other of the lateral edges of the rectangular sheet metal plate by a distance substantially the same as the distance between the slots, the slots defining three parallel planar legs, the legs each including a central longitudinal axis and having opposite ends, one of the opposite ends of said legs being integrally joined to a transverse body portion of the rectangular sheet metal plate defined by the other of said opposite ends of said sheet metal plate, said slots each having an end adjacent said transverse body portion of the rectangular sheet metal plate, said ends of said slots each defining a semicircular curve, one end of said semicircular curve terminating in a linear edge of a first one of said legs, and an opposite end of said curve terminating in a linear edge of a second one of said legs, said linear edge of said one of said legs being parallel too and spaced apart from said linear edge of said second one of said legs by the diameter of said semicircular curve, and so as to cut elongated indentations in each of the lateral edges of said rectangular sheet metal plate, said elongated indentations having opposite ends and extending from said one of said opposite ends of said rectangular sheet metal plate toward the other of said opposite ends of said rectangular sheet metal plate and terminating at said transverse portion, and each of said indentations terminating in an arcuate curve, bending and connecting the edges of the rectangular sheet metal plate to form a cylinder such that the transverse body portion of the rectangular sheet metal plate forms a cylindrical body having a central longitudinal axis, and such that the indentations stamped in the lateral edges of said rectangular sheet metal plate are in opposed relation and define a linear slot between a pair of said legs, said linear slot defined by said indentations terminating at said transverse body portion and a semicircular curve defined by said arcuate curves, one end of said semicircular curve terminating in a linear edge of one leg and an opposite end of said semicircular curve terminating in a linear edge of another of said legs, with said linear edges of said legs spaced apart by the diameter of said semicircular curve, bending each of the legs about the central longitudinal axis of each such leg and such that each leg includes a first planar portion and a second planar portion joined by a bend portion extending along the length of each leg, the bend portion extending into a portion of the cylindrical body, moving the other of the opposite ends of the legs radially outwardly away from the central longitudinal axis of the cylinder such that the legs will diverge outwardly away from one another and with the opposite ends of said legs forming ground engaging supports spaced apart from one another, and the first planar portion of one of the legs being substantially coplanar with a second planar portion of a second one of the legs, fixedly connecting the other of the ends of the legs together in spaced apart relation, said step of fixedly connecting the legs together including the steps of inserting an elongated brace member between the ends of a pair of the legs, the elongated brace member including opposite ends, fixedly connecting one of the oppoiste ends of the brace member to a first planar portion of one of the legs, and fixedly connecting the other of the opposite ends of the brace member to a second planar portion of an end of another of the legs.

* * * * *